(12) United States Patent
Grossman

(10) Patent No.: US 7,182,150 B2
(45) Date of Patent: Feb. 27, 2007

(54) CORDLESS HAND HELD POWER TOOL WITH POWERED ACCESSORY

(75) Inventor: Horst Grossman, Huenfelden-Kirberg (DE)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/804,417

(22) Filed: Mar. 19, 2004

(65) Prior Publication Data

US 2004/0251041 A1  Dec. 16, 2004

(30) Foreign Application Priority Data

Mar. 21, 2003 (GB) ................. 0306486.2

(51) Int. Cl.
*B25D 17/14* (2006.01)
(52) U.S. Cl. ............... 173/198; 173/171; 173/217; 408/58; 408/67
(58) Field of Classification Search ........... 173/217, 173/171, 198; 408/58, 67, 241 S; 175/209; D8/61, 70
See application file for complete search history.

(56) References Cited

U.S. PATENT DOCUMENTS

| | | | |
|---|---|---|---|
| 3,511,322 A * | 5/1970 | Holman et al. ............. 173/75 |
| 3,850,254 A | 11/1974 | Hirdes | |
| 3,900,787 A | 8/1975 | Koster | |
| 4,051,547 A | 9/1977 | Wood | |
| 4,064,952 A | 12/1977 | Lechner | |
| 4,097,176 A | 6/1978 | Wanner et al. | |
| 4,184,226 A | 1/1980 | Loevenich | |
| 4,207,953 A | 6/1980 | Reibetanz et al. | |
| 4,250,971 A | 2/1981 | Reibetanz et al. | |
| 4,779,687 A | 10/1988 | Schreiber et al. | |
| 4,780,805 A | 10/1988 | Chewuk et al. | |
| 4,783,729 A | 11/1988 | Konopka | |
| 4,825,140 A | 4/1989 | St. Louis | |
| 4,930,583 A | 6/1990 | Fishiya et al. | |
| 5,034,041 A * | 7/1991 | Austin ................... 55/385.1 |
| 5,090,499 A | 2/1992 | Cuneo | |
| 5,099,157 A | 3/1992 | Meyer | |
| 5,113,951 A | 5/1992 | Houben et al. | |
| 5,120,983 A | 6/1992 | Samann | |
| 5,129,467 A | 7/1992 | Watanabe et al. | |
| 5,199,174 A | 4/1993 | Wild | |
| 5,199,501 A | 4/1993 | Kluber et al. | |

(Continued)

FOREIGN PATENT DOCUMENTS

EP   1 281 486   2/2003

(Continued)

*Primary Examiner*—Scott A. Smith
(74) *Attorney, Agent, or Firm*—Michael P. Leary; Charles E. Yocum; Adan Ayala

(57) ABSTRACT

An accessory system, such as a dust collection system (40) of a hand held power tool, such as a drilling and/or hammering tool comprising, the tool, an accessory unit (40) comprising a separate motor for powering the unit and releasably mountable on the tool, and a battery pack (4). When the accessory unit is not required, the battery pack can be mounted directly on the tool for powering to tool and when the accessory unit is required the battery pack can be mounted on the accessory unit for powering the accessory unit and, when the accessory unit is mounted on the tool, for powering the tool via the accessory unit.

20 Claims, 7 Drawing Sheets

U.S. PATENT DOCUMENTS

| | | |
|---|---|---|
| 5,256,906 A | 10/1993 | Tsuge et al. |
| 5,467,835 A | 11/1995 | Obermeier et al. |
| 5,541,457 A | 7/1996 | Morrow |
| 5,662,440 A | 9/1997 | Kikuchi et al. |
| 5,747,973 A | 5/1998 | Robitaille et al. |
| 5,881,823 A | 3/1999 | Kabatnik et al. |
| 5,904,453 A | 5/1999 | Gavia |
| 5,955,791 A | 9/1999 | Irlander |
| 6,060,793 A | 5/2000 | Cousy |
| 6,222,285 B1 | 4/2001 | Haley et al. |
| 6,223,835 B1 | 5/2001 | Habedank et al. |
| 6,376,942 B1 * | 4/2002 | Burger et al. ................. 310/47 |
| 6,615,930 B2 * | 9/2003 | Bongers-Ambrosius et al. . 173/198 |
| 6,675,912 B2 * | 1/2004 | Carrier ........................ 173/217 |
| 6,729,413 B2 * | 5/2004 | Turner et al. ................ 173/217 |
| D499,946 S * | 12/2004 | Stirm .......................... D8/70 |
| 6,830,113 B2 * | 12/2004 | Moore et al. ............... 173/198 |
| 6,851,898 B2 * | 2/2005 | Ege et al. .................... 408/67 |
| 2002/0129949 A1 | 9/2002 | Bongersw-Ambrosius et al. |

FOREIGN PATENT DOCUMENTS

| | | |
|---|---|---|
| GB | 1 515 390 | 6/1978 |

* cited by examiner

CORDLESS HAND HELD POWER TOOL WITH POWERED ACCESSORY

The present invention relates to a powered accessory, such as a dust collection system for a hand held cordless power tool, such as a drilling and/or hammering tool. In particular the present invention relates to a system of a cordless drilling and/or hammering tool, a battery pack for powering the tool and an accessory unit, such as a dust collection unit for collecting dust generated by the tool. The present invention also relates to an accessory unit for use in such a system.

BACKGROUND OF THE INVENTION

Hand held drilling and/or hammering tools are known in the art which are powered by a battery pack instead of by a mains or generator source via a cord or cable. Such battery packs are generally rechargeable and house a plurality of electrical rechargeable cells. When the battery pack is mounted on the tool a releaseable mechanical connection is formed to secure the battery pack to the tool and an electrical connection is formed to supply electrical current from the cells to the motor of the battery pack. The battery pack is periodically removed from the tool so that is can be recharged by connection to a battery charger.

Hand held drilling and/or hammering tools are also know which can be used with a dust collection unit accessory. The collection unit, may be releaseably mechanically mounted on the tool and will generally comprise a shroud for collecting dust from the region of a tool or bit of the tool, a dust collection chamber, a filter and a system for generating an airflow into and through the shroud, through the chamber and the filter. Dust and debris generated by the tool or bit of the tool will be entrained in this airflow and so will be pulled into the shroud and into the chamber. As the air passes through the filter, any dust or debris entrained within it will be deposited in the chamber.

Both the dust collection unit and battery pack can be bulky and heavy and for a dust collection accessory for a cordless tool, both require connection to the tool.

BRIEF SUMMARY OF THE INVENTION

The present invention aims to provide an efficient accessory system for a hand held cordless power tool, which has optimum performance, is flexible and ergonomic.

According to a first aspect of the present invention there is provided an accessory system of a cordless hand held power tool, comprising:
the tool;
an accessory unit (40) comprising a separate motor for powering the unit and releasably mountable on the tool; and
a battery pack (4);
characterised in that the battery pack can be mounted on the accessory unit for powering the accessory unit and, when the accessory unit is mounted on the tool, for powering the tool via the accessory unit.

By using a separate motor (separate from the motor of the tool) for powering the accessory unit, optimum performance of the accessory unit can be achieved, independent of the performance characteristics of the motor of the tool. The system according to the present invention also provides a flexible and ergonomic system for powering the tool and/or the accessory unit. The battery pack can be releasably mounted on the tool or can be separately releasably mounted on the accessory unit, so as to power the tool only when the accessory unit is not required or so as to power the tool and the accessory unit attached to the tool, when the accessory is required.

The tool will generally include a switch for actuating the motor of the tool and this switch may be arranged such that when the battery pack is mounted on the accessory unit and when the accessory unit is mounted on the tool, depression of the switch actuates power supply to the motor of the tool and to the motor of the accessory unit. Alternatively, the accessory unit may be actuated by a separate switch on the unit.

According to a preferred embodiment the tool may comprise a common mechanical and electrical interface via which the battery pack can be mounted on and electrically connected to the hammer or via which the accessory unit can be mounted on and electrically connected to the hammer. Similarly, the battery pack preferably comprises a common mechanical and electrical interface via which it can be mounted on and electrically connected to the accessory unit or via which it can be mounted on and electrically connected to the tool. The mechanical and electrical interfaces may advantageously comprise a rail and groove connection and a releaseable latch arrangement.

In a preferred embodiment, the accessory unit may comprises a first electrical and mechanical interface, via which it can be mounted on and electrically connected to the tool, a second electrical and mechanical interface, via which it can be mounted on and electrically connected to the battery pack, and an electrical connection between the first and second interfaces, via which electrical current is passed from the battery pack to the tool, when the accessory unit is mounted on the tool and the battery pack is mounted on the accessory unit.

The accessory unit may be a dust collection unit for collecting dust generated by the operation of the tool.

In a preferred embodiment, the dust collection unit includes a fan and the motor of the unit powers the fan so as to generate an optimum dust collecting airflow, independent of the speed of the motor of the tool. Such a dust collection unit may comprise a shroud for collecting dust from the vicinity of a tool or bit of the tool, which shroud communicates with a filter housing, incorporating a filter, such that an airflow generated by the fan passes into the shroud, into the filter housing and then into the fan.

The battery pack may be mounted on the tool from a first direction with respect to a longitudinal axis of the tool and may be mounted on the accessory unit, when the accessory unit is mounted on the tool, from a second different direction with respect to the axis.

According to a second aspect of the present invention there is provided an accessory unit for a cordless hand held power tool which is releasably mountable on such a tool and comprises a separate motor for powering the unit, characterised in that the accessory unit comprises a first interface via which it can be mechanically and electrically connected to such a tool and a second interface via which it can be mechanically and electrically connected to a battery pack, which battery pack is for powering the motor of the accessory unit and, when the accessory unit is mounted on such a tool, for powering such a tool via the accessory unit. Again, the motor of the accessory unit may be actuated when a tool to which the accessory unit is mounted is actuated. Also, the accessory unit may be a dust collecting unit as described above.

In order to power the tool from the battery pack via the dust collection unit, the accessory unit may advantageously comprise an electrical connection between the first and second interfaces, via which electrical current is passed from a battery pack to a tool, when the accessory unit is mounted on a tool and a battery pack is mounted on the accessory unit.

BRIEF DESCRIPTION OF THE DRAWINGS

One form of cordless rotary hammer incorporating dust collection system according to the present invention will now be described by way of example with reference to the accompanying drawings in which.

DETAILED DESCRIPTION OF THE INVENTION

Figure 1:
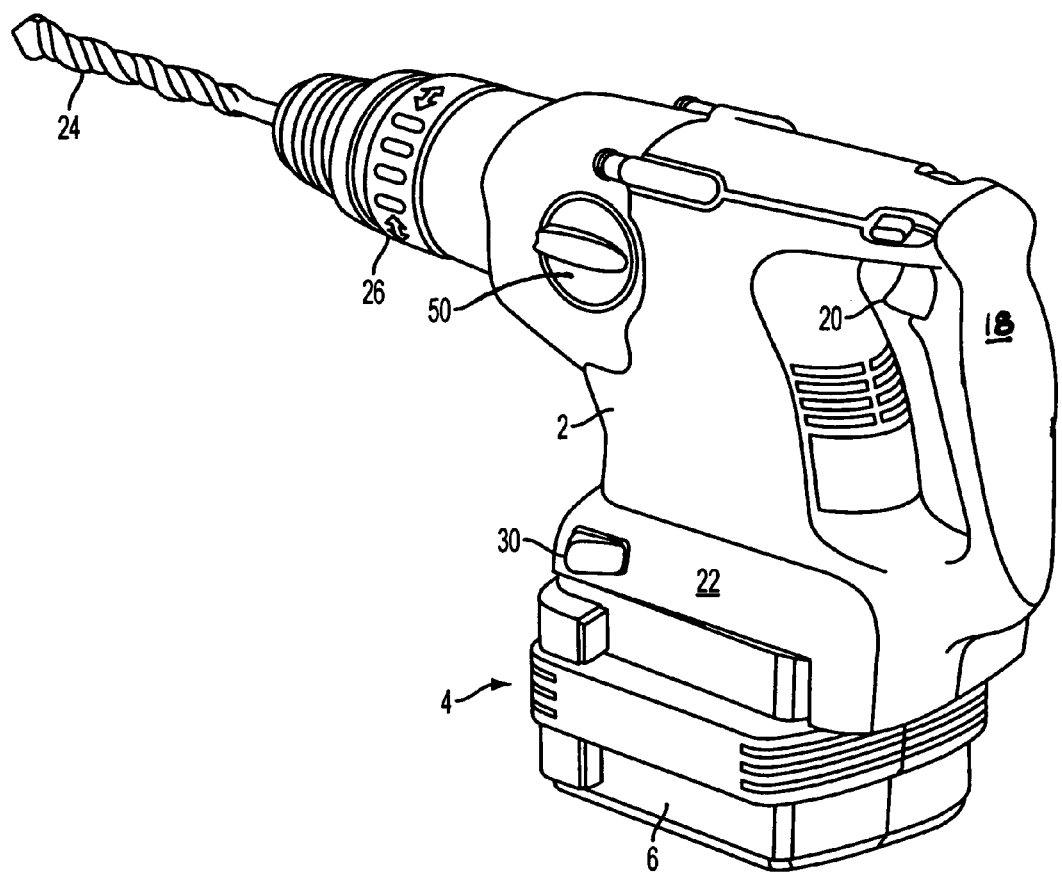
FIG. 1 shows a perspective view of a cordless rotary hammer in accordance with the present invention with a battery pack fitted to it.

The hand held cordless rotary hammer shown in the Figures has a housing comprising a motor housing portion (2) within which an electric motor (3) of the hammer is housed. A tool holder (26) is located at the forward end of a spindle of the hammer. A tool or bit (24) can be non-rotatably and releasably fitted within the tool holder so as to allow limited reciprocation of the tool or bit with respect to the tool holder. The hammer has a rear handle (18) in which an on/off trigger (20) is located for actuating a switch for actuating power supply to the motor (3). The motor of the hammer selectively drives a spindle drive mechanism for rotatingly driving the spindle of the hammer, thereby rotatingly driving the tool holder (26) and a tool or bit (24) mounted therein, as is well known in the art. Also, the motor of the hammer selectively drives an air cushion hammering mechanism for repeatedly impacting the tool or bit (24), as is well known in the art. A mode change arrangement, actuated by a mode change knob (50), is provided for enabling the selective engagement of rotary drive to the spindle and/or selective actuation of the air cushion hammering mechanism so that the hammer can be operated in a drilling only mode, a hammering only mode and/or a combination rotary hammering mode, as is well known in the art.

The rotary hammer is powered by a battery pack (4), of the type shown in the Figures. The battery pack comprises a housing (6) in which a number of rechargeable electrical cells (7) are housed, as is well known in the art. The housing (6) has an upper sub-housing (10) which covers a portion of the upper surface of the housing (6). The sub-housing houses an electrical connection arrangement (Z) (See FIG. 7) to the cells (7) of the battery pack which is accessible by via a plurality of passageways into the sub-housing (10), which passageways are separated by guide ribs (8). A recess (12) for receiving a fixing latch is formed in the upper surface of the sub-housing (10) and a pair of outwardly facing rails (14) are formed to either side of the sub-housing so as to extend in the longitudinal direction of the battery pack, designated by arrow (A). A recess is formed underneath each rail, which recess is terminated by a rib (16) at a first end of the recess.

The battery pack (4) can be releasably mounted on the rotary hammer, as shown in FIG. 1. The hammer has a lower housing portion (22) on the underside of which are formed a pair of inwardly facing rails (28) (see FIG. 2) which cooperate with the outwardly facing pair of rails (14) on the battery pack, so that a sliding rail and groove connection can be formed between the battery pack (4) and the lower housing portion (22). The forward ends of the pair of rails (28) are initially engaged with the open ends of the recesses under the rails (14) and then the battery pack is slid rearwardly with respect to the lower housing portion (22) until the open ends of the rails (14) abut a stop arrangement on the underside of the lower housing portion (22). As the rails (14) come into abutment with the stop arrangement a spring biased latch (not shown) extending downwardly from the underside of the lower housing portion (22) engages in the recess (12) in the sub-housing (10) of the battery pack (4) to thereby secure the battery pack to the lower housing portion. Also, as the battery pack (4) is moved rearwardly along the rails (28) electrical connectors (Y) (See FIG. 7) on the underside of the lower housing portion (22) move into the passageways between the ribs (8) of the sub-housing (10) of the battery pack and into electrical connection with the electrical connection (Z) to the cells (7). Thereby, the motor of the hammer is electrically connected to and powered by the cells of the battery pack (4).

In order to remove the battery pack (4) from the lower housing portion (22), a button (30) on the side of the lower housing portion is depressed so as to retract the latch from the recess (12) in the sub-housing (10) of the battery pack (4). Thereafter, the battery pack can be moved slideably forward along the rails (28) of the lower housing portion (22) and removed completely from the lower housing portion (22), for example for charging.

Figure 4:
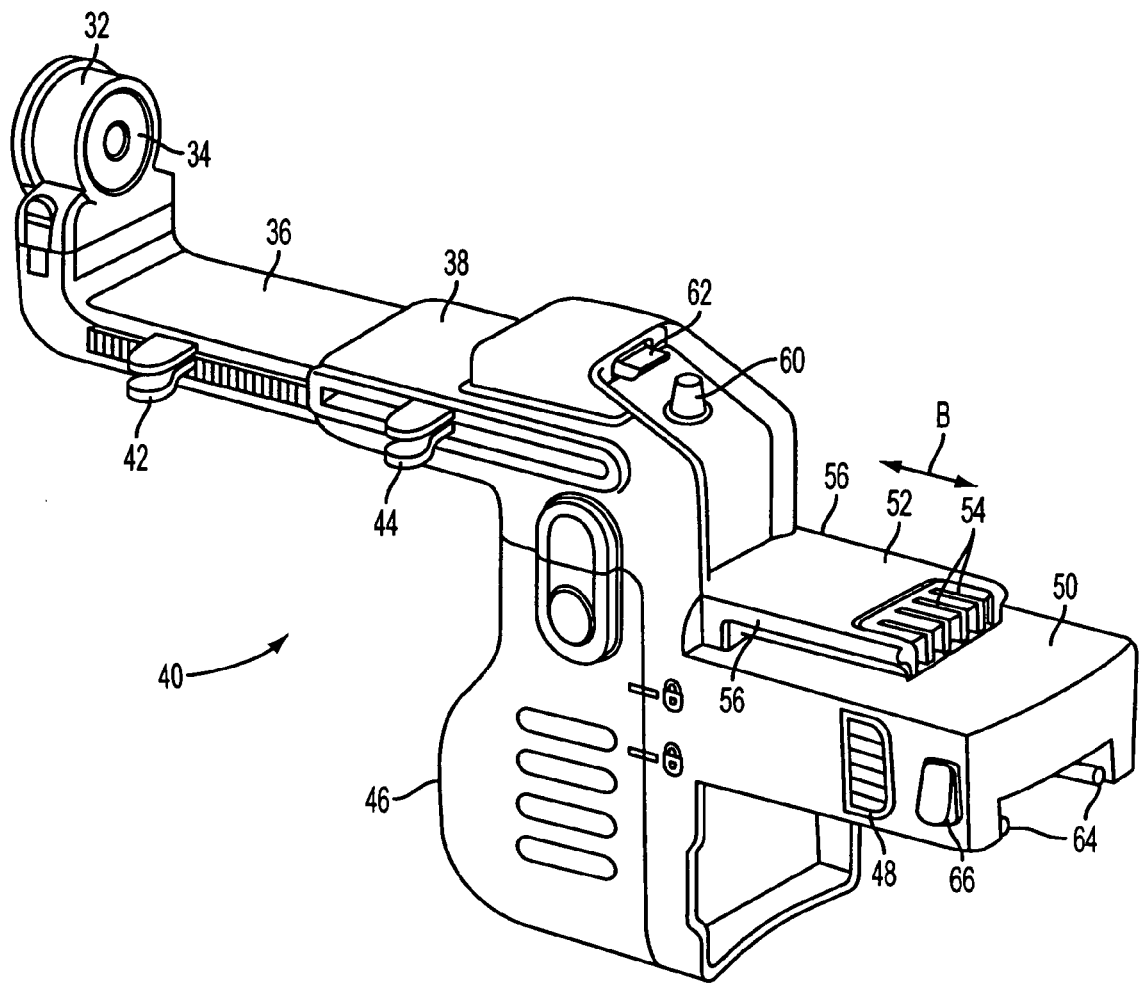
FIG. 4 shows a perspective view of a dust collection unit for the rotary hammer of FIG. 1 in accordance with the present invention.
Figure 5:
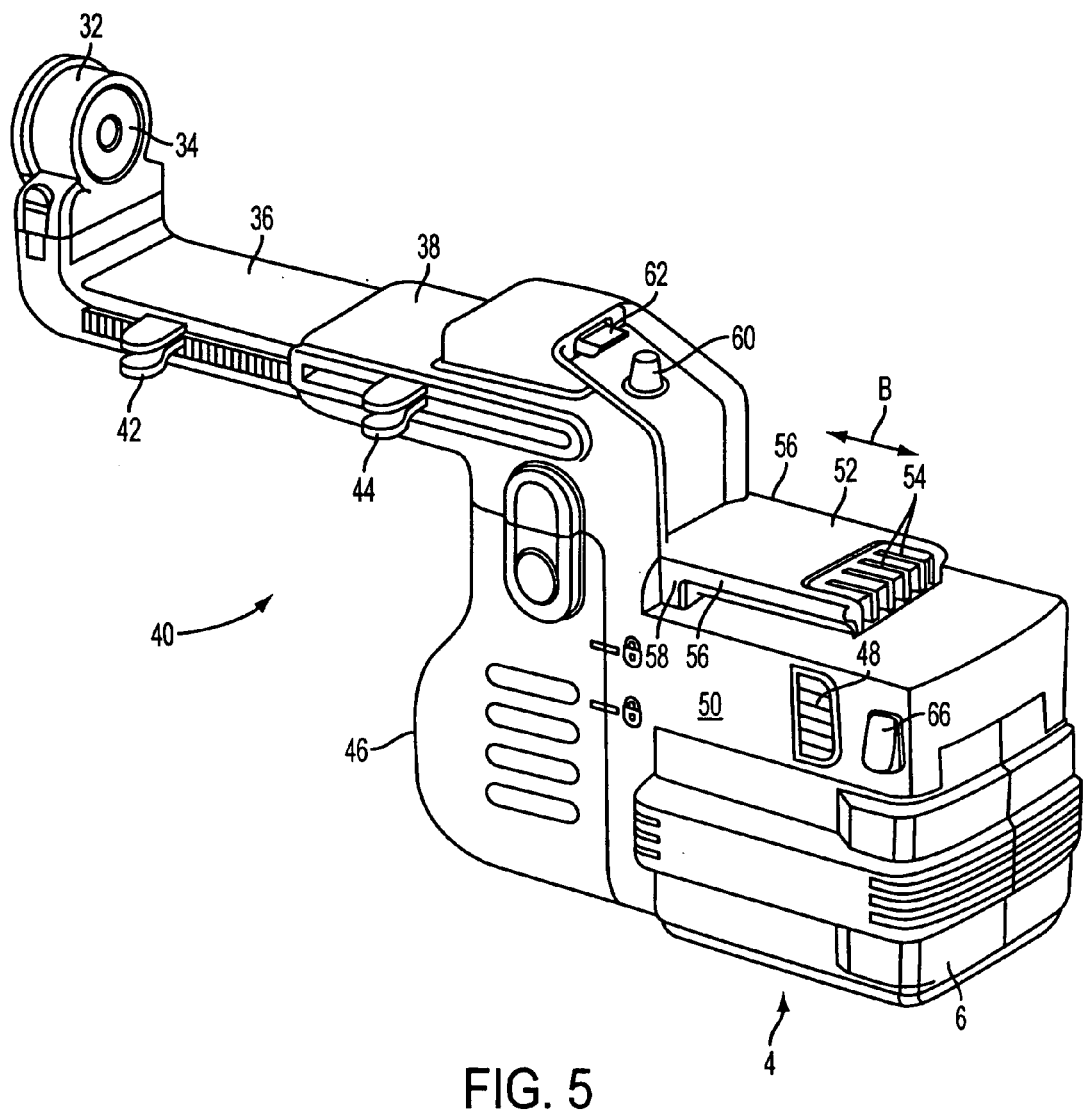
FIG. 5 shows a perspective view of the dust collection unit of FIG. 4 with the battery pack of FIGS. 1 to 3B fitted to it.
Figure 6:
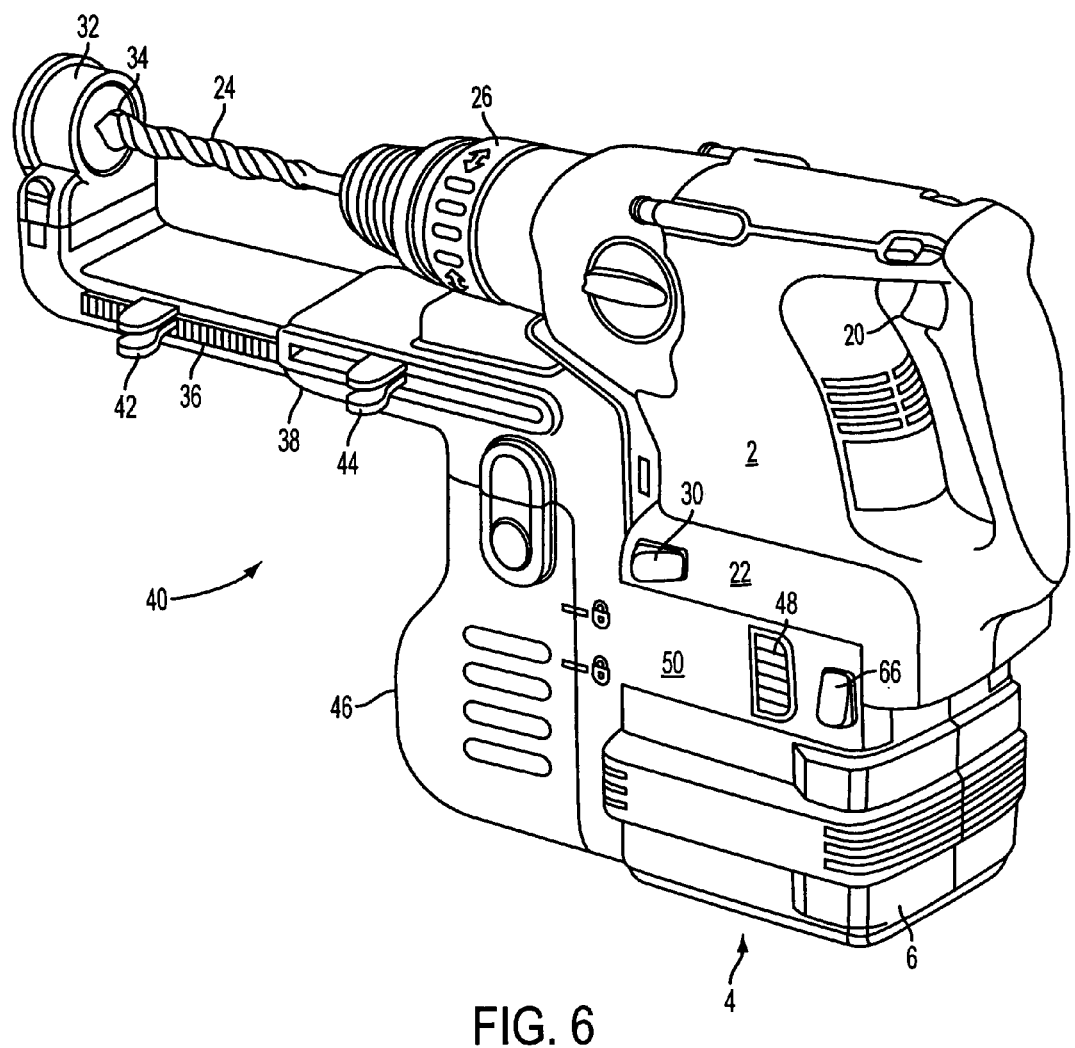
FIG. 6 shows a perspective view of the rotary hammer of FIG. 2 with the dust collection unit and battery pack sub-assembly of FIG. 5 fitted to it.

FIGS. 4 to 6 show a dust collection unit (40) for the hammer. The dust collection unit comprises a dust collection shroud (32) which, when the unit (40) is mounted on the hammer (as shown in FIG. 6), surrounds the forward end of a tool or bit (24) mounted in the tool holder (26) of the hammer. The shroud (32) forms a chamber around the forward end of the tool or bit (24), the rearward wall of which is formed by a flexible brush (34) which fits around the tool or bit (24). The shroud (32) is mounted on a support arm (36) which is telescopically mounted within a receiving portion (38) of a main housing of the dust collection unit (40). The support arm (36) can be pushed into the receiving portion (38) against a biasing force from a spring arrangement contained in the receiving portion (38). The maximum extent to which the support arm (36) extends forwardly of the receiving portion (38) and the extent to which the support arm can be retracted into the receiving portion can be set by the adjustment of a pair of stops (42, 44). A channel extends along the support arm (36) with a first end of the channel communicating with the chamber of the shroud (32) and the second end of the channel communicating with an entrance to a filter chamber of the unit (40).

The unit (40) comprises a filter chamber, formed partially by a releasable cover (46). A filter arrangement is housed within the filter chamber. The filter chamber has an inlet which communicates with the channel in the support arm (36) and an outlet which communicates with an inlet to a fan. The fan has an outlet (48). The fan is powered by a motor (49) housed in the rearward housing portion (50) of the dust collection unit (40).

The rearward housing portion (50) of the dust collection unit (40) has an upper sub-housing (52) which covers a portion of the upper surface of the housing portion (50). The sub-housing houses a first electrical connection arrangement (X) which is connected to the fan motor (49) of the unit (40) and which is connected to a second electrical connection arrangement (W) for connection to a battery pack (4) (as described below) (See FIG. 7). The first electrical connection arrangement (X) of the unit (40) is accessible via a plurality of passageways into the sub-housing (52), which passageways are separated by guide ribs (54). A pair of outwardly facing rails (56) are formed to either side of the sub-housing so as to extend in the longitudinal direction of the unit (40), designated by arrow (B). A recess is formed underneath each rail, which recess is terminated by a rib (58) at a first forward end of the recess. The unit (40) is formed with an upwardly extending projection (60) which is engageable with a correspondingly shaped recess on the underside of the housing of the hammer. The unit (40) is also provided with a rearwardly extending retractable latch (62) which is engageable with a correspondingly shaped recess of the underside of the housing of the hammer. The latch (62) can be retracted against a biasing spring arrangement by pressing a button located on the opposite side of the hammer housing to that shown in the Figures.

The dust collection unit (40) can be releasably mounted on the rotary hammer, as shown in FIG. 6. The pair of inwardly facing rails (28) (see FIG. 2) of the hammer cooperate with the outwardly facing pair of rails (56) on the unit (40), so that a sliding rail and groove connection can be formed between the unit (40) and the lower housing portion (22). The forward ends of the pair of rails (28) are initially engaged with the open ends of the recesses under the rails (56) and then the dust collection unit (40) is slid rearwardly with respect to the lower housing portion (22) until the open ends of the rails (56) abut a stop arrangement on the underside of the lower housing portion (22). As the rails (56) come into abutment with the stop arrangement, the projection (60) can be moved upwardly into engagement with the corresponding recess on the hammer housing and the latch (62) engages in the corresponding the recess in the housing of the hammer to thereby secure the unit (40) to the hammer housing. Also, as the unit (40) is moved rearwardly along the rails (28) electrical connectors (Y) on the underside of the lower housing portion (22) move into the passageways between the ribs (54) of the sub-housing (52) of the unit (40) and into electrical connection with the first electrical connection arrangement (X) and thus into connection with the fan motor (49) and with the second electrical connection arrangement (W) for connection to a battery pack (4) (See FIG. 7).

In order to remove the unit (40) from the housing of the hammer, the button on the dust collection unit (40) is depressed so as to retract the latch (62) from the corresponding recess (12) in the hammer housing. Thereafter, the unit (40) can be tilted downwardly to release the projection (60) from its corresponding recess in the hammer housing and then the unit (40) can be moved slideably forward along the rails (28) of the lower housing portion (22) and removed completely from the lower housing portion (22).

The fan motor (49) of unit (40) and the motor (3) of the hammer can both be powered by a battery pack (4), of the type described above. The battery pack (4) can be fitted to the unit (40) so as to power the fan motor of the unit and power the motor of the hammer via the unit.

Figure 7:
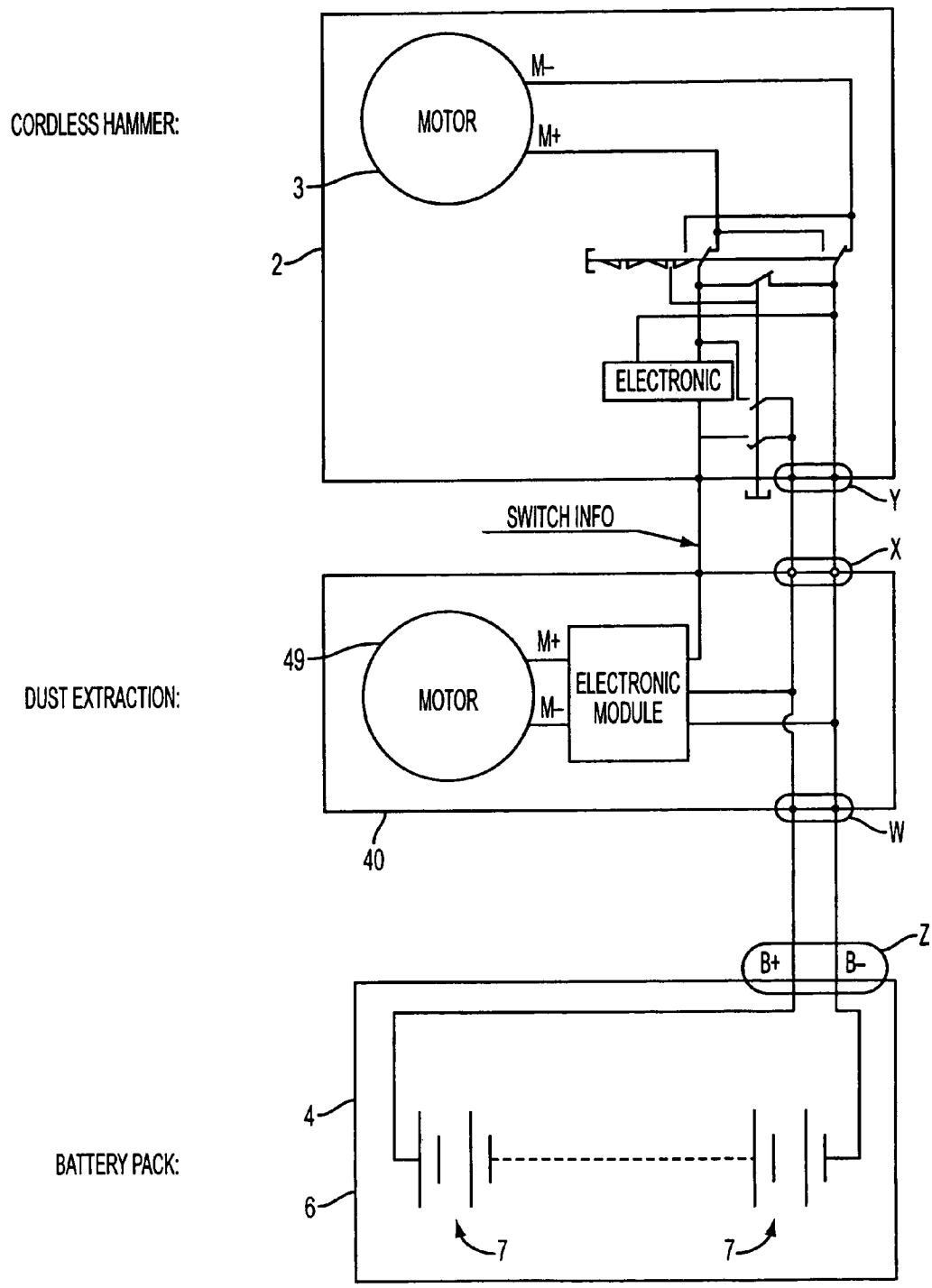
FIG. 7 shows a circuit diagram of the wiring between the rotary hammer of FIG. 1, the dust extraction unit of FIG. 4 and the battery pack of FIGS. 3A and 3B with the battery pack fitted to the dust extraction unit and the dust extraction unit fitted to the rotary hammer, as shown in FIG. 6.

The dust collection unit (40) has a rearward housing portion (50) on the underside of which are formed a pair of inwardly facing rails (64) (see FIG. 4) which cooperate with the outwardly facing pair of rails (14) on the battery pack, so that a sliding rail and groove connection can be formed between the battery pack (4) and the rearward housing portion (50). The rearward ends of the pair of rails (64) are initially engaged with the open ends of the recesses under the rails (14) and then the battery pack is slid forwardly with respect to the rearward housing portion (50) until the open ends of the rails (14) abut a stop arrangement on the underside of the rearward housing portion (50). As the rails (14) come into abutment with the stop arrangement a spring biased latch (not shown) extending downwardly from the underside of the rearward housing portion (50) engages in the recess (12) in the sub-housing (10) of the battery pack (4) to thereby secure the battery pack to the rearward housing portion of the dust collection unit (40). Also, as the battery pack (4) is moved forwardly along the rails (28) the second electrical connection arrangement (W) on the underside of the rearward housing portion (50) of the dust collection unit (40) moves into the passageways between the ribs (8) of the sub-housing (10) of the battery pack and into electrical connection with the electrical connection (Z) to the cells. Thereby, the fan motor (49) of the dust collection unit (40) is electrically connected to and powered by the cells (7) of the battery pack (4). There is also an electrical connection between the second electrical connection arrangement (W) on the underside of the rearward housing portion (50) and the first electrical connection arrangement (X) of the sub-housing (52) of the housing portion (50), via which the motor (3) of the hammer is powered, when the dust collection unit is fitted on the hammer, as shown in FIG. 6. The circuit diagram showing the wiring between the battery pack (4), the dust extraction unit (40) and the rotary hammer is shown in FIG. 7.

In order to remove the battery pack (4) from the rearward housing portion (50) of the dust extraction unit (40), a button (66) on the side of the rearward housing portion is depressed so as to retract the latch from the recess (12) in the sub-housing (10) of the battery pack (4). Thereafter, the battery pack can be moved slideably rearward along the rails (64) of the rearward housing portion (50) and removed completely from the lower housing portion (22), for example for charging.

Figure 2:
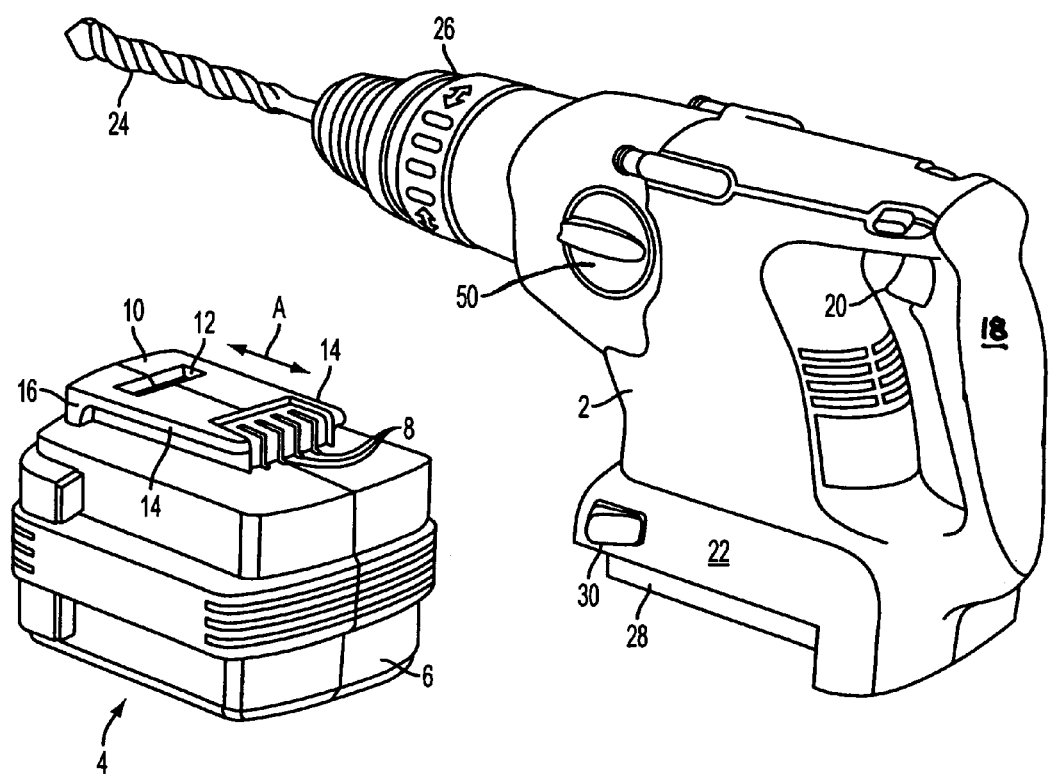
FIG. 2 shows a perspective view of the cordless rotary hammer of FIG. 1 with the battery pack detached from it.
Figures 3A, 3B:
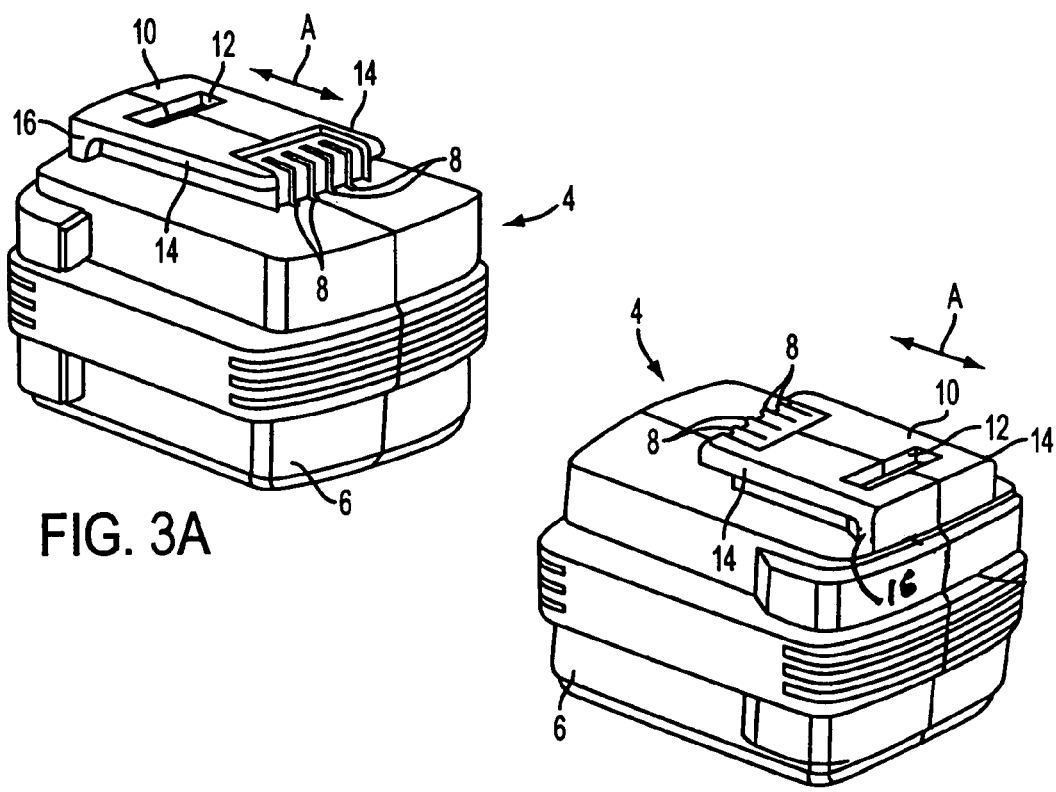
FIG. 3A shows a rear perspective view of the battery pack of FIGS. 1 and 2.
FIG. 3B shows a front perspective view of the battery pack of FIGS. 1 and 2.

Thus, in order to use the hammer without the dust collection unit (40), the battery pack (4) is fitted to the hammer as shown in FIG. 1. The battery pack (4) can be removed from the hammer, as shown in FIG. 2, for recharging of the battery pack.

In order to use the hammer with the dust collection unit (40) the battery pack is removed forwardly from the hammer, and the dust extraction unit is fitted to the hammer, as described above. The battery pack (4) is turned through 180° and mounted on the dust extraction unit (40) from the rearward direction. The resulting configuration is shown in FIG. 6. Then the shroud is adjusted, according to the length of the tool or bit (24), by adjusting the stops (42, 44) so that the chamber of the shroud (32) surrounds the forwardmost portion of the tool or bit so that when the tool or bit is pressed against a surface to be worked on, the forwardmost rim of the shroud (32) abuts the surface. Then when the motor (3) of the hammer is actuated, by depressing the trigger (20) of the hammer, the cells (7) of the battery pack (4) power the motor (3) of the hammer via the connections (ZW) and (XY) through the dust collection unit (40) and power the fan motor (49) of the dust collection unit (40). The tool or bit (24) is pressed against the surface and dust is generated.

The motor fan generates an airflow which is pulled into the shroud, for example via one or more recesses in the forward face of the rim of the shroud (32), and from the shroud through the channel in the support arm (36) and into the inlet to the filter housing. The generated dust is entrained in this airflow and thus transported into the filter housing. The dust is captured in the filter housing by a filter arrangement and the air passes through the filter and into the inlet of the fan. The air passes through the fan and is discharged out of the outlet (48) to the fan. Periodically, the filter housing cover (46) can be removed and the filter housing emptied of collected dust. As the tool or bit (24) moves into the surface being worked, the support arm (36) retracts against the biasing force of the spring arrangement and maintains the forwardmost rim of the shroud against the surface being worked. When the trigger (20) of the hammer is released, the power to the hammer motor and the fan motor is disconnected.

The invention claimed is:

1. An accessory system of a cordless hand held power tool, comprising:
   a cordless hand held power tool including a first motor;
   an accessory unit (40) comprising a second motor (49) for powering the unit, which accessory unit is releasably mountable on the tool; and
   a battery pack (4);
   characterised in that the battery pack can be mounted on the accessory unit for powering the accessory unit and, when the accessory unit is mounted on the tool, for powering the tool via the accessory unit.

2. An accessory system according to claim 1 wherein the battery pack (4) can be one of releasably mounted on the tool and releasably mounted on the accessory unit.

3. An accessory system according to claim 1 wherein the tool includes a switch for actuating the first motor of the tool arranged such that when the battery pack is mounted on the accessory unit and when the accessory unit is mounted on the tool, depression of the switch actuates power supply to the first motor of the tool and to the second motor of the accessory unit.

4. An accessory system according to claim 1 wherein the tool comprises a common mechanical and electrical interface (28) via which the battery pack (4) is mounted on and electrically connected to the tool or via which the accessory unit (40) is mounted on and electrically connected to the tool.

5. An accessory system according to claim 4 wherein the mechanical and electrical interface comprises a rail and groove connection (28) and a releasable latch arrangement.

6. An accessory system according to claim 1 wherein the battery pack (4) comprises a common mechanical and electrical interface (12, 14, 16) via which it is mounted on and electrically connected to one of the accessory unit (40) and the tool.

7. An accessory system according to claim 6 wherein the mechanical and electrical interface comprises a rail and groove connection (14) and a releaseable latch arrangement (10).

8. An accessory system according to claim 1 wherein the accessory unit comprises a first electrical and mechanical interface (56, X), via which the accessory unit is mounted on and electrically connected to the tool and a second electrical and mechanical interface (64, W), via which the accessory unit is mounted on and electrically connected to the battery pack (4) and an electrical connection (XW) between the first and second interfaces, via which electrical current is passed from the battery pack to the tool, when the accessory unit is mounted on the tool and the battery pack is mounted on the accessory unit.

9. An accessory system according to claim 1 wherein the accessory unit is a dust collection unit (40) for collecting dust generated by the operation of the tool.

10. An accessory system according to claim 9 wherein the dust collection unit (40) includes a fan and the motor (49) of the accessory unit powers the fan so as to generate a dust collecting airflow.

11. An accessory system according to claim 10 wherein the dust collection unit comprises a shroud (32) for collecting dust from the region of a tool or bit (32) of the tool, which shroud communicates with a filter housing, incorporating a filter, such that an airflow generated by the fan passes into the shroud, into the filter housing and then into the fan.

12. An accessory system according to claim 1 wherein the battery pack (4) is mounted on the tool from a first direction with respect to a longitudinal axis of the tool and is mounted on the accessory unit (40), when the accessory unit is mounted on the tool, from a second direction different from the first direction with respect to the axis.

13. An accessory system according to claim 1 wherein the tool is a rotary hammer tool.

14. An accessory unit (40) for a cordless hand held power tool which is releasably mountable on such a tool and the accessory unit comprises:
   a battery pack;
   a separate motor (49) for powering the accessory unit;
   a first interface (14, X) via which the accessory unit can be mechanically mounted and electrically connected to the power tool; and
   a second interface (64, W) via which the accessory unit can be mechanically mounted and electrically connected to the battery pack (4), which battery pack is for powering the motor of the accessory unit and, when the accessory unit is mounted on the power tool, for powering the power tool via the accessory unit.

15. An accessory unit according to claim 14 wherein the motor of the accessory unit is actuated when the tool to which the accessory unit is mounted is actuated.

16. An accessory unit according to claim 14 wherein at least one of the first interface and the second interface includes a rail and groove connection (28, 64) and a releasable latch arrangement.

17. An accessory unit according to claim 14 additionally comprising an electrical connection (XW) between the first and second interfaces, via which electrical current is passed from a battery pack to a tool, when the accessory unit is mounted on a tool and a battery pack is mounted on the accessory unit.

18. An accessory unit according to claim 14 wherein the accessory unit is a dust collection unit (40) for collecting dust generated by operation of such a tool.

19. An accessory unit according to claim 18 wherein the dust collection unit (40) includes a fan and the motor (49) of the unit powers the fan so as to generate a dust collecting airflow.

20. An accessory unit according to claim 19 and further comprising a shroud (32) for collecting dust from the vicinity of a bit (32) of a tool, which shroud communicates with a filter housing, incorporating a filter, such that an airflow generated by the fan passes into the shroud, into the filter housing and then into the fan.

* * * * *